Patented Jan. 12, 1943

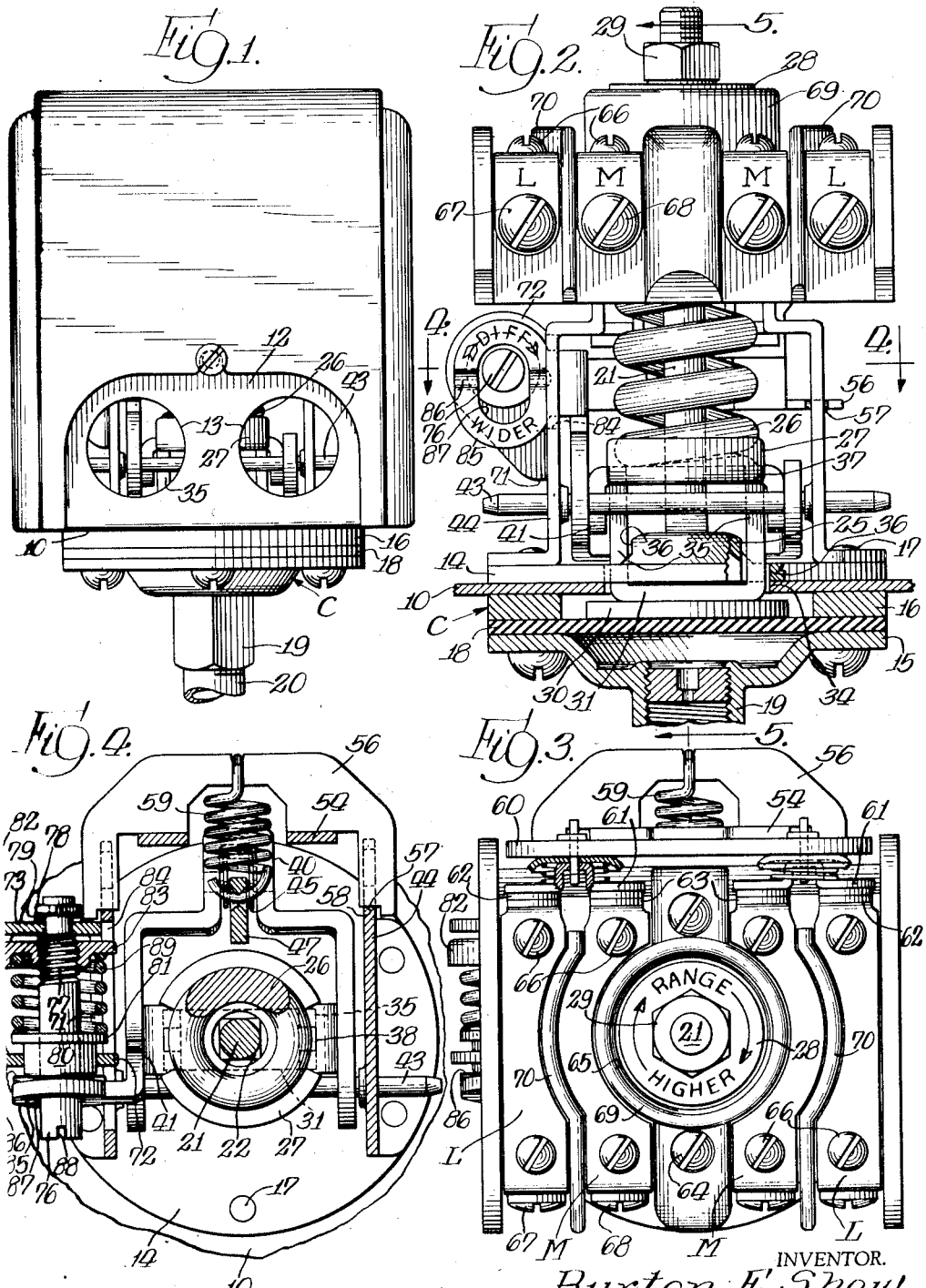

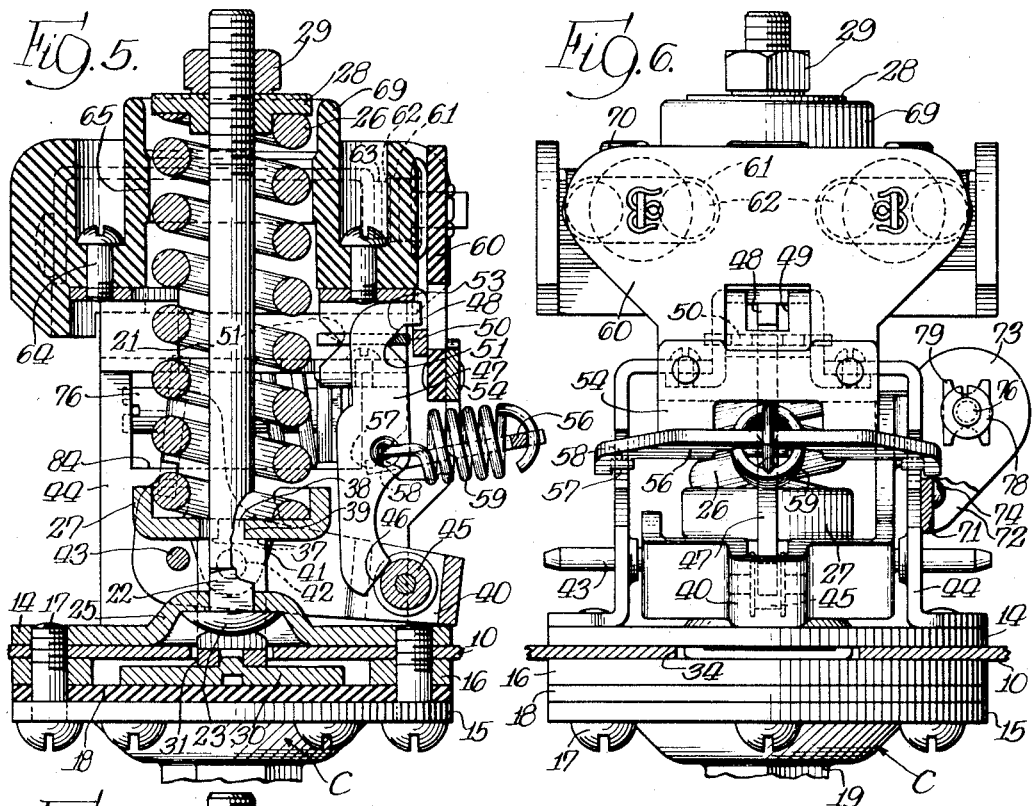
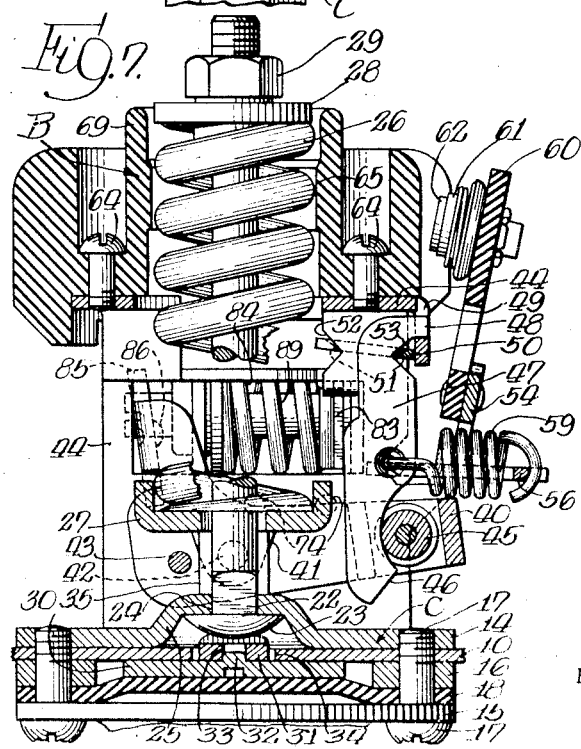
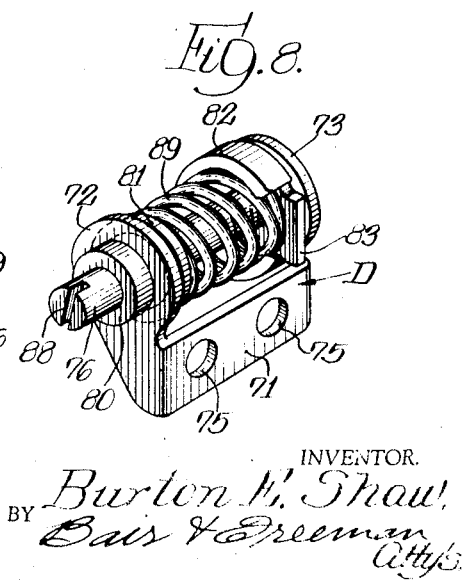

2,308,312

UNITED STATES PATENT OFFICE 2,308,312

CONTROL STRUCTURE

Burton E. Shaw, Bristol, Ind., assignor to Penn Electric Switch Co., Goshen, Ind., a corporation of Iowa Application October 14, 1940, Serial No. 361,121

18 Claims. (Cl. 200—83)

My present invention relates to a control structure such as an automatic electric switch for controlling air compressor motors and the like in accordance with pressure conditions resulting from operation of the compressor.

One object of the invention is to provide a control structure which is comparatively compact in design yet adaptable for heavy duty operation for controlling relatively high air pressures and including a rugged switch structure so designed as to permit a minimum of size for the control structure.

Another object of the invention is to provide an air compressor switch or the like wherein a comparatively massive switch construction for controlling air compressor motors of high horse power is contained so that it substantially spans the interior of a relatively small casing and the range spring is arranged to pass upwardly through a bore of a contact block of the switch structure.

A further object is to provide a pressure switch wherein a relatively heavy range spring is supported by a range adjusting screw in tension and the adjusting screw and range spring are axially located relative to the diaphragm so that no part of the frame of the control structure need be made strong enough to take the thrust of the spring and a relatively light main control arm and pivot therefor may be provided.

Still a further object is to provide a combination V over roller and toggle spring connection between the main control arm and the switch arm and to provide a novel knife edge type of link connection for an operating link of the structure.

Another object is to provide a differential adjusting means consisting of a single unitary sub-assembly which may be pre-fabricated and adjusted and then attached to the control structure by means of a pair of screws or the like.

Still another object is to provide the differential adjusting means in the form of a bracket with a pair of perforated ears and the differential spring and its adjusting means as well as the part of the differential adjusting means engageable with the main control arm, all assembled with relation to the bracket so that the entire unit may after assembly be mounted on the switch.

With these and other objects in view, my invention consists in the construction, arrangement and combination of the various parts of my device whereby the objects contemplated are attained, as hereinafter more fully set forth, pointed out in my claims and illustrated in the acompanying drawings. Although the invention is susceptible of a variety of embodiments, it is unnecessary to fully describe and illustrate more than one in order to give a full understanding of the invention both from its structural and functional standpoints. Accordingly, I have illustrated a preferred and desirable embodiment of the invention in the accompanying drawings, in which:

Figure 1 is a full-size elevation of the control structure embodying my invention, showing the casing thereof in position.

Figure 2 is an enlarged elevation ofg the mechanism with the casing removed.

Figure 3 is a plan view of the mechanism shown in Figure 2.

Figure 4 is a horizontal sectional view thereof taken on the line 4—4 of Figure 2.

Figure 5 is a vertical sectional view taken on the line 5—5 of Figure 2, and showing the switch mechanism of my control structure in closed position.

Figure 6 is an elevation of the control structure taken from the reverse side relative to Figure 2.

Figure 7 is a sectional view similar to Figure 5, showing the parts in switch open position.

Figure 8 is a perspective view of the sub-assembly constituting my differential adjusting means.

On the accompanying drawings I have used the reference character C to indicate generally a diaphragm casing. The casing C includes a base plate 10 having an upstanding flange 12 provided with a pair of electrical conduit receiving openings 13. The diaphragm casing C further includes a top member 14, a bottom member 15 and a spacer ring 16.

The elements 10, 14, 15 and 16 are held assembled by a plurality of screws 17 with a diaphragm 18 interposed between the elements 15 and 16. The element 15 constitutes a diaphragm head and includes a threaded boss 19 with which a pipe or the like 20 may be connected, such pipe extending to some part of the compressed air system from which pressure is to be communicated to the diaphragm 18 for operating the control structure.

Located axially relative to the diaphragm 18 is a range adjusting screw 21. The screw 21 has a squared portion 22 and a head 23. The squared portion 22 extends through a square opening 24 in an upwardly depressed portion 25 of the top member 14.

On the screw 21 a range spring 26 is located and it is confined between spring followers 27 and 28.

An adjusting nut 29 is threaded on the screw 21 for engagement with the spring follower 28 while the spring follower 27 is operatively connected with the diaphragm 18.

The operative connection includes a circular plate 30 against the top of the diaphragm and a U-shaped yoke 31 secured to the plate 30 by an upwardly depressed portion 32 thereof pressed into an opening 33 of the yoke 31. The base plate 10 has an opening 34 to accommodate the cross piece of the yoke while the arms of the yoke indicated at 35 are extended upwardly through a pair of openings 36 in the top member 14. The openings 36 are located on opposite sides of the head 23 of the range screw 21. The upper ends of the arms 35 of the yoke 31 are shouldered as indicated at 37 in Figure 5 and reduced at their terminal ends as indicated at 38. The reduced ends enter slots 39 formed in the spring follower 27.

From the foregoing construction it is obvious that the range spring 26 tends to force the spring follower 27 downwardly and through thrust move the yoke 31 and the diaphragm follower plate 30 also downwardly against the pressure of any air that might be under the diaphragm. Such movement is transmitted to a main control arm 40 by means of a pair of ears 41 extending downwardly from the spring follower 27 and pivoted to the control arm 40 by rivets 42. The control arm 40 is pivoted on a pin 43 supported by an inverted U-shaped frame 44 secured to the diaphragm casing C by four of the screws 17.

The control arm 40 carries a roller 45 coacting with a V cam 46 of a link 47. The link 47 is longitudinally slidable and limited in its sliding movement by a lug 48 in a slot 49 of the frame 44. A link connection is provided for the link 47 in the form of a closed loop 50 having knife edges 51 coacting with V notches 52 and 53 in the frame 44 and the link 47 respectively.

A switch arm 54 is provided having a toggle lever 56. The arm 54 has a pair of knife edges 57 seated in V seats 58 of the frame 44. A toggle spring 59 serves as an operative connection between the toggle arm 56 of the switch arm 54 and the link 47. At the same time the spring 59 tends to keep the V over roller connection 45—46 properly engaged and the link connection 51 seated at its knife edges 51 in the V notches 52 and 53.

A plate of insulation 60 is secured to the switch arm 54 and carries a pair of bridging contacts 61. The contacts 61 are adapted to bridge a pair of line contacts 62 with relation to a pair of motor contacts 63.

A contact block B is provided for the contacts 62 and 63, such block being preferably of insulating material. The block B is secured by screws 64 to the frame 44 and is provided with a central bore 65. Terminal strips L and M are provided for the contacts 62 and 63 and these strips are secured by screws 66 to the contact block B. The strips L and M are provided with terminal screws 67 and 68 respectively, for connection with line wires and with wires leading from the air compressor motor.

Surrounding the bore 65 in the contact block B above the upper surface of the block is a boss 69 serving as a barrier between the terminal strips M and the range spring 82. It will be noted that the contact strips M are curved to clear the barrier boss 69 and the terminal strips L are also curved to follow the contour of the strips M. Between the strips L and M are barrier walls 70 formed of the insulating material of the block B.

The arrangement just described provides space for the relatively heavy range spring 26 and also the necessary space for the relatively heavy current carrying terminal strips L and M all in a compact space permitting the enclosure of the control structure in a relatively small casing with the contacts mounted adjacent one side of the structure and the terminal screws 67 and 68 adjacent the other side thereof.

At the same time electrical barriers are provided between the live terminal strips M and the grounded portion of the control structure which at the point closest to the terminal strips is the spring 26. This construction also permits an axial arrangement of the spring with relation to the diaphragm so that the control arm 40 will not have any excessive strains put upon it or its pivot pin 43 in spite of the heavy range spring and air pressures acting upon the control arm.

I provide a differential adjusting means in the form of a sub-assembly indicated generally at D in Figure 8. The differential adjusting assembly consists of a bracket 71 having a pair of perforated ears 72 and 73. The bracket 71 is detachably secured as by a pair of screws 74 to one side of the frame 44, the bracket being provided with openings 75 to accommodate the screws.

A differential adjusting screw 76 extends through the perforations of the ears 72 and 73 and is rotatably and non-slidably mounted relative to the ears by means of a screw threaded portion 77 forming a shoulder on one side of the ear 73 and a collar 78 mounted on the other side of the ear 73. A spring or friction washer 79 is interposed between the collar 78 and the ear 73 to prevent undesired play and retain the screw 76 in any desired adjusted position.

Slidable in the perforation of the ear 72 is a sleeve 80 having a stop flange 81. The stop flange 81 serves as a spring follower in conjunction with a second spring follower 82. The follower 82 is threaded on the portion 77 of the adjusting screw 76 and has a lug 83 slidable in a slot 84 of the frame 44. The coaction between the lug 83 and the slot 84 prevents rotation of the follower 82 relative to the bracket 71.

The outer end of the sleeve 80 is adapted to engage an extension 85 of the main control arm 40 during a portion of its travel. The extension 85 has a pair of humps 86 formed thereon to engage the end of the sleeve 80 and has an opening 87 through which the differential adjusting screw 76 loosely extends. The screw 76 is provided with a slot 88 or may be of some suitable shape to coact with a tool such as a screw driver for rotating the screw 76 and thereby changing the tension of a differential spring 89. The spring 89 is interposed between the followers 81 and 82.

When the switch is in open position the humps 86 are free of the sleeve 80 as shown in Figure 7 and the flange 81 then rests against the ear 72 and acts as a stop. When the control arm 40 reaches an intermediate position between its switch open position and switch closing position the humps 86 engage the sleeve 80 and thereafter slide the sleeve as to the position shown in Figure 4 with the differential spring 89 loading the arm 40 and thereby increasing the differential of operation. The amount of increase of course is determined by the adjustment of the differential spring 89.

The differential adjusting assembly D may readily be fabricated or assembled and adjusted as desired before the assembly is applied to the switch structure. This is a decided advantage from a manufacturing standpoint. After once installed the differential can be changed if desired by merely rotating the screw 76 in the proper direction.

Having described one specific embodiment of my invention together with the operation thereof, I desire it to be understood that this form is selected merely for the purpose of facilitating disclosure of the invention rather than for the purpose of limiting the number of forms which it may assume. It is to be further understood that various modifications, adaptations and alterations may be applied to the specific form disclosed to meet the requirements of practice without in any manner departing from the spirit and scope of the present invention except as set forth in the claims appended hereto.

I claim as my invention and desire to secure by Letters Patent of the United States:

1. In a control structure, a diaphragm, a diaphragm casing therefor and having an opening at substantially the center of the diaphragm, a range adjusting screw through said opening and having a head in the diaphragm casing, said screw being thereby substantially coincident with the axis of the diaphragm, a range spring on said range adjusting screw, a range adjusting nut on the outer end of said screw and contacting with one end of the spring, an operating lever pivoted relative to said diaphragm casing, a spring seat on said range screw and contacting with the other end of said range spring, an operative connection between said diaphragm and said spring seat comprising a yoke seated against the center of the diaphragm and having its arms on opposite sides of said head of said screw, said diaphragm casing having openings to permit sliding passage of said arms from the interior to the exterior of the diaphragm casing, a contact block of insulating material supported relative to said diaphragm casing and located on the axis of the diaphragm, contacts carried thereby, complementary contacts for coaction with the contacts of said contact block, an operative connection between said operating lever and said complementary contacts, said contact block having a bore therethrough to afford passage for said spring and screw, said contact block having a boss through which a portion of said bore extends, the contacts of said contact block including terminal strips curved to clear said boss and said boss serving as a barrier between said terminal strips and said spring and screw.

2. A control structure of the character described comprising a diaphragm, a diaphragm casing therefor, a range adjusting screw connected with said diaphragm casing, having its axis passing through the center of the diaphragm and being threaded, a range spring on said range adjusting screw, a range adjusting nut threaded on the threaded portion of said range adjusting screw and contacting with one end of the spring, an operating lever pivoted relative to said diaphragm casing, a spring seat on said range screw and contacting with the other end of said range spring, an operative connection between said spring seat and said operating lever, an operative connection between said diaphragm and said spring seat, a contact block of insulating material supported relative to said diaphragm casing, contacts carried thereby, complementary contacts for coaction with the contacts of said contact block, an operative connection between said operating lever and said complementary contacts, said contact block having a bore therethrough to afford passage for said spring and screw.

3. In a control structure, a diaphragm, a diaphragm casing therefor and having an opening at substantially the center of the diaphragm, a range adjusting screw through said opening and having a head in the diaphragm casing, said screw being thereby substantially coincident with the axis of the diaphragm, a range spring on said range adjusting screw, a range adjusting nut on the outer end of said screw, an operating lever pivoted relative to said diaphragm casing, an operative connection between said diaphragm and said operating lever, a contact block of insulating material supported relative to said diaphragm casing and located on the axis of the diaphragm, contacts carried thereby, complementary contacts for coaction with the contacts of said contact block, and an operative connection between said operating lever and said complementary contacts, said contact block having a bore therethrough to afford passage for said range spring and range adjusting screw.

4. In a control structure, a diaphragm, a diaphragm casing therefor, a range adjusting screw substantially coincident with the axis of said diaphragm and connected with said diaphragm casing, a range spring on said range adjusting screw, a range adjusting nut on said screw and contacting with one end of the spring, an operating lever pivoted relative to said diaphragm casing, and operatively connected with said range spring, a contact block of insulating material located on the axis of said diaphragm, contacts carried thereby, complementary contacts for coaction with the contacts of said contact block, an operative connection between said operating lever and said complementary contacts, said contact block having a bore therethrough to afford passage for said spring and screw, said contact block having a boss through which a portion of said bore extends, and terminal strips for the contacts of said contact block, said terminal strips being curved to clear said boss and said boss serving as a barrier between said terminal strips and said spring and screw.

5. In a control structure, a diaphragm, a diaphragm casing therefor, a range adjusting screw having a head at one end connected with said diaphragm casing adjacent the diaphragm, said screw being substantially axially located with respect to said diaphragm, a range spring on said range adjusting screw, a range adjusting nut on the outer end of said screw and contacting with one end of the spring, an operating lever pivoted relative to said diaphragm casing, a spring seat slidable on said range screw and contacting with the other end of said range spring, an operative connection between said spring seat and said operating lever, an operative connection between said diaphragm and said spring seat, a contact block of insulating material located on the axis of the diaphragm, contacts carried thereby, complementary contacts for coaction with said first contacts, said complementary contacts being operatively connected with said operating lever and said contact block having a bore to receive said spring and screw.

6. In a control structure, a frame, a diaphragm casing thereon, a diaphragm in said diaphragm casing, a range adjusting screw axially located and extending from said diaphragm casing, a range spring thereon, a range adjusting nut and a spring follower on said range adjusting screw, an operative connection between said diaphragm and said spring follower, a pivoted actuating arm operatively connected with said spring follower, a link operatively connected with said actuating arm by V over roller mechanism, a switch operatively connected with said link, said link being longitudinally movable within predetermined limits and having a link connection between said frame and the first link, said link connection having knife edge connections with said frame and with said first link, the operative connection of said switch to said first link including a toggle spring effective to retain said knife edge connections of said link connection in operative engagement and to effect snap action of said switch with respect to said first link.

7. In a control structure, a frame, a diaphragm casing thereon, a diaphragm in said diaphragm casing, a range adjusting screw extending from said diaphragm casing, a range spring thereon, a range adjusting nut and a spring follower on said range adjusting screw, an operative connection between said diaphragm and said spring follower, a pivoted actuating arm operatively connected with said spring follower, a link operatively connected with said actuating arm by V over roller mechanism, a control device operatively connected with said link, said link being longitudinally movable within predetermined limits, a link connection between said frame and the first link, said link connection having knife edge connections with said frame and with said first link, the operative connection of said control device to said first link including a spring effective to retain said knife edge connections of said link connection in operative engagement.

8. In a control structure, a frame, a diaphragm casing thereon, a diaphragm in said diaphragm casing, an axially arranged range adjusting screw, a range spring, a range adjusting nut, a spring follower on said range adjusting screw, an operative connection between said diaphragm and said spring follower, an actuating arm operatively connected with said spring follower, a link operatively connected with said actuating arm by V over roller mechanism, and a switch operatively connected with said link, the operative connection of said switch to said link including a toggle spring effecting snap action of said switch relative to said link.

9. A control structure comprising a frame, a diaphragm casing thereon, a diaphragm in said diaphragm casing, a range adjusting screw axially located and having one end connected with said diaphragm casing, a range spring thereon, a range adjusting nut and a spring follower on said range adjusting screw, an operative connection between said diaphragm and said spring follower, an actuating arm operatively connected with said spring follower, a link operatively connected with said actuating arm, a switch operatively connected with said link, said link being longitudinally movable within predetermined limits, a link connection between said frame and the first link, said link connection having knife edge connections with said frame and with said first link, the operative connection of said switch to said first link including a means effective to retain said knife edge connections of said link connection in operative engagement.

10. In a control structure, a frame, a diaphragm casing supported thereon, a diaphragm in said diaphragm casing, a control arm operatively connected with said diaphragm, a switch structure operated by said control arm, and differential widening means comprising a sub-assembly including a bracket attachable to said frame, said bracket having a pair of perforated ears, an adjusting screw rotatably and non-slidably supported through the perforations of said ears, a differential spring on said adjusting screw, a pair of spring followers therefor, one of said spring followers being threaded on said screw and the other having a projecting portion slidable through the perforation of one of said ears, said last spring follower having a stop flange to engage the ear in which it is slidably mounted and the projecting portion thereof being positioned to be engaged by said control arm during that part of its movement occuring between an intermediate position of the control arm and one of its limits of movement.

11. In a control structure, a control arm, means for operating said control arm, and differential widening means comprising a sub-assembly including a bracket attachable to said frame, an adjusting screw supported by said bracket, a differential spring on said adjusting screw, a pair of spring followers therefor, one of said spring followers being threaded on said screw and the other having a projecting portion slidably movable relative to said bracket, said last spring follower having a stop to engage the bracket and the projecting portion thereof being positioned to be engaged and moved by said control arm during that part of its movement occurring between an intermediate position of the control arm and one of its limits of movement.

12. In a control structure, a frame, a diaphragm supported thereon, a control arm operatively connected with said diaphragm, and differential widening means comprising a bracket having a pair of perforated ears, an adjusting screw rotatably and non-slidably supported through the perforations of said ears, a differential spring on said adjusting screw, a pair of spring followers therefor, one of said spring followers being threaded on said screw, said last spring follower having a stop to engage said bracket and a projecting portion positioned to be engaged by said control arm and said stop thereby disengaged from said bracket whereby the force of said differential spring is imposed on said control arm during that part of the movement of said control arm between an intermediate position and one of its limits of movement.

13. In a control structure, a frame, a diaphragm casing supported thereon, a diaphragm in said diaphragm casing, a control arm operatively connected with said diaphragm, a control device operated by said control arm, and differential widening means comprising a sub-assembly including a bracket attachable to said frame, an adjusting screw rotatably and non-slidably supported by said bracket, a differential spring on said adjusting screw, a pair of spring followers therefor, one of said spring followers being threaded on said screw and the other having a projecting portion, said last spring follower being stopped by engagement with said bracket and the projecting portion thereof being positioned to be engaged by said control arm during a part of its movement to impose the force of said differential spring on the control arm.

14. A control structure comprising a frame, a diaphragm casing thereon, a diaphragm in said diaphragm casing, a range adjusting screw axially located and extending from said diaphragm casing, a range spring thereon, a range adjusting nut and a spring follower on said range adjusting screw, an operative connection between said diaphragm and said spring follower, an actuating arm operatively connected with said spring follower, a link operatively connected with said actuating arm by V over roller mechanism, a switch operatively connected with said link, said link being longitudinally movable within predetermined limits, a link connection between said frame and the first link, said link connection having knife edge connections with said frame and said first link, the operative connection of said switch to said first link including a toggle spring effective to retain said knife edge connections of said link connection in operative engagement, and differential widening means comprising a sub-assembly including a bracket attachable to said frame, an adjusting screw rotatably and non-slidably supported by said bracket, a differential spring on said adjusting screw, a pair of spring followers therefor, one of said spring followers being threaded on said screw and the other having a projecting portion to be engaged by said control arm for imposing the force of said differential spring on said control arm during that part of its movement occurring between an intermediate position of the control arm and one of its limits of movement.

15. A control structure comprising a frame, a diaphragm, a control arm operatively connected with said diaphragm, a switch structure operated by said control arm, and differential widening means comprising a sub-assembly including a bracket attachable to said frame, said bracket having a pair of perforated ears, an adjusting screw rotatable and non-slidably supported through the perforations of said ears, a differential spring on said adjusting screw, a pair of spring followers therefor, said frame having a slot, one of said spring followers being threaded on said screw and having a portion projecting through said slot to permit movement of said spring follower axially of said adjusting screw but prevent rotation of said spring follower relative to said bracket, the other spring follower having a projecting portion slidable through the perforation of one of said ears, said last follower having a stop engaging the ear through which said portion is slidably mounted and said portion being positioned to be engaged by said control arm during part of its movement, said control arm having a portion engageable with said projecting portion of said last spring follower and provided with an opening through which said adjusting screw extends, said adjusting screw having a tool engageable portion accessible through said opening.

16. In a control structure, a diaphragm, a control arm operatively connected with said diaphragm, and differential widening means for said control arm comprising a sub-assembly including a bracket, an adjusting screw supported by said bracket, a differential spring on said adjusting screw, a pair of spring followers therefor, one of said spring followers having a projecting portion positioned to be engaged by said control arm during part of this movement, said control arm having a portion engageable with said projecting portion of said last spring follower and provided with an opening through which said adjusting screw extends, said adjusting screw having a tool engageable portion accessible through said opening.

17. In a control structure, a diaphragm, a diaphragm casing therefor, a range adjusting screw connected with said diaphragm casing, a range spring on said range adjusting screw, a range adjusting nut on said screw and contacting with one end of the spring, an operating lever pivoted relative to said diaphragm casing, and operatively connected with said range spring, a contact block of insulating material, contacts carried thereby, complementary contacts for coaction with the contacts of said contact block, an operative connection between said operating lever and said complementary contacts, said contact block having a bore therethrough to afford passage for said spring and screw, and terminal strips for the contacts of said contact block, said terminal strips being curved to clear said bore.

18. In a control structure, a frame, a diaphragm casing thereon, a diaphragm in said diaphragm casing, an axially arranged range adjusting screw, a range spring, a range adjusting nut, a spring follower on said range adjusting screw, an operative connection between said diaphragm and said spring follower, an actuating arm operatively connected with said spring follower, a link mounted for limited floating movement and operatively connected with said actuating arm by V over roller mechanism, and a switch operatively connected with said link, the operative connection of said switch to said link including a toggle spring effecting, in conjunction with the floating movement of said link, snap action of said switch relative to said link.

BURTON E. SHAW.